UNITED STATES PATENT OFFICE.

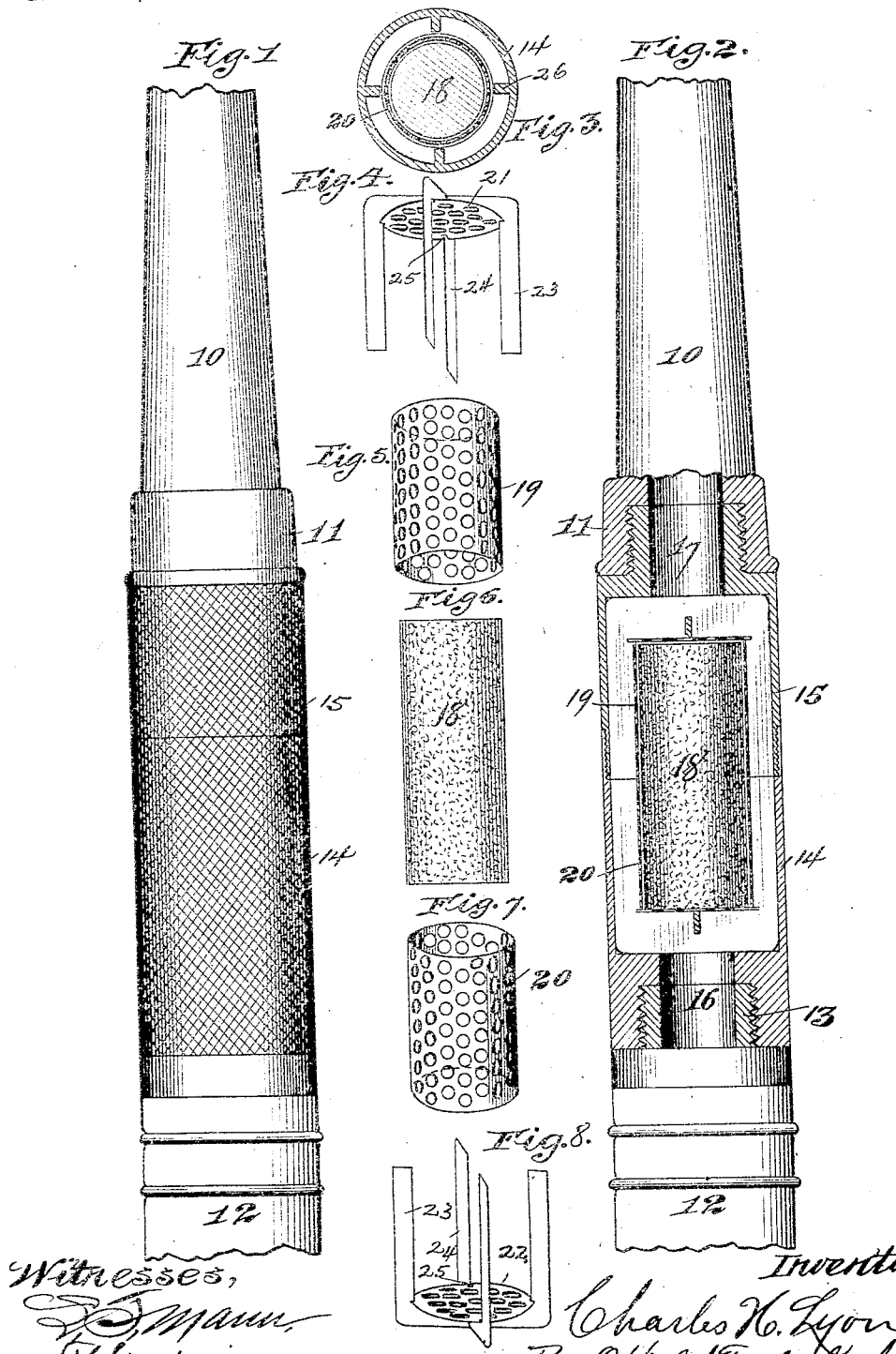

CHARLES H. LYON, OF CHICAGO, ILLINOIS.

DISTRIBUTING FERTILIZERS.

SPECIFICATION forming part of Letters Patent No. 563,195, dated June 30, 1896.

Application filed May 13, 1895. Serial No. 549,110. (No model.)

*To all whom it may concern:*

Be it known that I, CHARLES H. LYON, of Chicago, Illinois, have invented certain new and useful Improvements in Distributing Fertilizers, of which the following is a specification.

This invention relates to a means for applying a fertilizer to lawns, &c., and is intended to be used in connection with a fertilizer reduced to the form of a solid and adapted to be gradually dissolved by permitting water to flow over the solid, the water carrying with it in solution the fertilizing material.

In the application of my invention, which is shown in the accompanying drawings, and hereinafter described and claimed, I take a fertilizing compound in the form of a solid, and preferably cylindrical in shape, and inclose it with the waterway of a pipe-coupling or pipe-section adapted to be used in connection with a garden-hose; and to this end I construct a container from two pipe-sections provided with means whereby they may be detachably connected together and provided also with means for connecting them between the coupling members of two sections of garden-hose or between one of said sections and the hose-nozzle. Within the hollow body of the container I preferably removably secure a cylindrical shell constructed in two sections, one for each section of the container, and provide said perforated shell with strengthening and spacing ribs, so that the shell is held centrally of the chamber and a waterway is provided around the sides of said shell. The end portions of the perforated shell may be formed separately from the body portion.

While the preferred construction is as above described, I do not limit my invention thereto, as the same may be embodied in various forms and the structural details thereof varied at pleasure.

In the accompanying drawings, Figure 1 is a plan view showing my invention as applied between a section of hose and the nozzle, the latter being shown broken away. Fig. 2 is a similar view, partly in longitudinal section, through the container and hose-couplings. Fig. 3 is a transverse section showing a modified construction wherein the spacing and strengthening ribs are provided on the interior walls of the container. Figs. 4, 5, 6, 7, and 8 show the several interior parts of the container separated, Figs. 4, 5, 7, and 8 being perspective views of the perforated shell and its supports, and Fig. 6 a plan view of the fertilizing compound.

In the drawings, 10 represents the base portion of a hose-nozzle of ordinary construction, and 11 its coupling member.

12 represents a section of hose, and 13 its coupling member. Between these parts, as shown in Figs. 1 and 2, is placed my container composed of the two sections 14 and 15, each of which has a water-passage, (indicated at 16 17, respectively,) and is provided with means for connecting it to the coupling-sections 11 and 13 or for such other coupling mechanisms as it may be desired to employ. The meeting ends of said sections 14 and 15 may be adapted for threaded engagement with each other and they provide a large chamber to contain the fertilizer. The latter is preferably in the form of a solid and highly concentrated and may be compressed into a solid cake of cylindrical form, as shown at 18, Figs. 2 and 6. The constituents of this fertilizer need not be herein described. This body 18 is placed within the container, and in order that it may be held centrally therein I prefer to employ a perforated shell to receive it and a frame composed of ribs for spacing and strengthening said shell. These several parts are shown in Figs. 4, 5, 7 and 8, the parts shown in Figs. 5 and 7 being alike and each composed of a cylinder of thin sheet metal. (Marked 19 and 20, respectively.) For convenience of manufacture I prefer to make them by rolling a thin sheet of perforated metal into the form of a cylinder and overlapping and soldering the edges thereof. The end portions of the cylinder are marked 21 22, respectively, and they are perforated metal disks. In order to hold them in place and also to confine the sections 19 and 20, I may employ the bracing-ribs 23 and 24, each being substantially U-shaped and their prongs projecting parallel and their bodies crossing each other and engaging the disks; as, for example, by reason of their edges entering notches 25 in said disks. The portions 23 are of such length and bear such relation to the sections 19 and 20 and the compound 18 that when all are placed in position the cylinder 18 is inclosed by the perforated sections 19 and 20, its ends are confined by the disks 21 and 22, and the whole is centered and held in place by the ribs 23, which abut against the ends of the large chamber in the sections 14 15, thus holding the fertilizing compound centrally of the interior space of the container and providing waterways around its sides.

In use water passing through the hose under pressure will be forced around the sides of the fertilizing compound and, striking the end of the cylinder and passing through the perforations of the shell, will gradually dissolve the fertilizing material and carry it away in solution through the nozzle.

By means of this invention a highly-concentrated fertilizing compound may be applied in solution evenly to a grass plot or to plants and shrubbery.

The container when constructed as above described will hold the restraining compound until it has been almost completely dissolved, and when exhausted a fresh supply may be introduced by uncoupling the sections 14 and 15. When the latter are separated, the shell-sections 19 and 20 with their respective bracing-ribs and end caps will part, each remaining in its respective member of the container, so that in supplying fresh material the mere unscrewing of the sections 14 and 15 enables a new cylinder to be placed and the device put in position for use again by reëngaging said sections.

Obviously various modifications of the structural features of the invention may be made, as, for example, instead of employing the spacing and strengthening ribs 23, ribs 26, Fig. 3, may be cast or integrally formed on the interior walls of the sections 14 and 15, and by placing said ribs close together and employing a perforated cap, such as 21, at the discharge end of the container, the perforated shell-sections 19 and 20 may be dispensed with, or the ends of the ribs might be joined at the discharge end in the same way that the ribs 23 are joined, so as to prevent the cylinder from being driven into the discharge-orifice 17.

Again, if parts corresponding to those shown in Figs. 4, 5, 7, and 8 be employed, they might be constructed of other materials and of other forms than there shown. The perforated cylinder might be made all in one, and one of the end caps might be omitted, as the force of the water will hold the fertilizing compound in position. Instead of connecting the container to the nozzle it might be placed at some other point along the line of hose, as, for example, near the source of supply or between two sections of hose, so that the additional weight thereof would not have to be supported by the person using the hose.

While I have described my invention as a fertilizer-distributer, I do not intend to restrict it to this specific use, as I contemplate employing the device shown for the distribution of a disinfectant in solution, and it may be applied to other uses.

Without, therefore, limiting my invention to these structural details, I claim—

1. A fertilizer-distributer comprising in combination a container composed of two metallic sections adapted for connection with each other and each having a waterway through its outer end and a larger chamber in its inner end and a perforated shell located within the chamber and supported out of contact with its walls whereby to provide a waterway around the sides and ends of the shell, substantially as described.

2. A fertilizer-distributer, comprising in combination a container constructed of two metallic sections separably connected with each other and having their opposite ends adapted for detachable engagement in a line of hose, a perforated shell adapted to retain a fertilizing compound centrally of the chamber and ribs interposed between the walls of the chamber and the shell and affording a waterway between them and around the shell, substantially as described.

3. A fertilizer-distributer, comprising in combination a container composed of two metallic sections adapted for threaded engagement with each other and also for threaded engagement in a line of hose, a perforated shell composed of two cylindric sections and a frame for each of said sections composed of strengthening and bracing ribs, substantially as described.

CHARLES H. LYON.

Witnesses:
C. C. LINTHICUM,
E. L. HUBER.